(12) United States Patent
Manthe et al.

(10) Patent No.: US 7,581,420 B2
(45) Date of Patent: Sep. 1, 2009

(54) LOCKOUT DEVICE

(75) Inventors: Rebecca Manthe, Milwaukee, WI (US);
Frank Scott, Milwaukee, WI (US);
Michael Brojanac, Jackson, WI (US);
Scott Czarnecki, Mukwonago, WI (US)

(73) Assignee: Master Lock Company LLC, Oak Creek, WI (US)

( * ) Notice: Subject to any disclaimer, the term of this patent is extended or adjusted under 35 U.S.C. 154(b) by 400 days.

(21) Appl. No.: 11/452,051

(22) Filed: Jun. 13, 2006

(65) Prior Publication Data

US 2006/0283215 A1    Dec. 21, 2006

Related U.S. Application Data

(60) Provisional application No. 60/689,854, filed on Jun. 13, 2005.

(51) Int. Cl.
*F16K 35/10* (2006.01)
(52) U.S. Cl. ............... 70/178; 70/14; 70/18; 70/58; 70/180; 137/385
(58) Field of Classification Search .............. 70/14, 70/18, 19, 57, 58, 163, 164, 177, 178, 180, 70/200–203, DIG. 63, 175; 137/383, 384.8, 137/385
See application file for complete search history.

(56) References Cited

U.S. PATENT DOCUMENTS

| | | | | |
|---|---|---|---|---|
| 2,377,036 A | * | 5/1945 | Quarfoot | 70/178 |
| 2,560,624 A | * | 7/1951 | Diestelbrink | 70/14 |
| 3,592,028 A | * | 7/1971 | La Monica | 70/57 |
| 3,667,259 A | * | 6/1972 | Reque et al. | 70/14 |
| 3,703,821 A | * | 11/1972 | Dorey | 70/38 R |
| 3,744,096 A | | 7/1973 | Kok | |

(Continued)

OTHER PUBLICATIONS

International Search Report and Written Opinion from International Application No. PCT/US07/14723, mailed Feb. 22, 2008.

(Continued)

*Primary Examiner*—Peter M Cuomo
*Assistant Examiner*—Christopher Boswell
(74) *Attorney, Agent, or Firm*—Calfee, Halter & Griswold LLP (57) ABSTRACT

A lockout device is provided for an instrument having a body and an actuating member extending from the body for operating the instrument. The lockout device includes a bottom member, a cover member, and a flexible member. The bottom member is adapted to be positioned over the body and includes a first holding portion and an aperture for receiving the actuating member. The cover member is connectable to the bottom member for movement between a closed position and an open position, and includes a covering portion for covering the actuating member in the closed position, and a second holding portion adapted to abut the first holding portion in the closed position. The flexible member has a first end connected to one of the bottom member and the cover member. The bottom member and cover member are adapted to receive a cinching portion of the flexible member between the first and second holding portions. When the flexible member is wrapped around a portion of the body and received between the first and second holding portions and the cover member is in the closed position, the first and second holding portions prevent movement of the cinching portion of the flexible member.

23 Claims, 10 Drawing Sheets

U.S. PATENT DOCUMENTS

| | | | | |
|---|---|---|---|---|
| 3,875,771 | A * | 4/1975 | Reisner | 70/18 |
| 3,980,099 | A | 9/1976 | Youngblood | |
| 4,685,315 | A * | 8/1987 | Comolli | 70/68 |
| 4,864,834 | A * | 9/1989 | Waite | 70/14 |
| 4,891,866 | A * | 1/1990 | Kasai | 24/170 |
| 5,003,797 | A | 4/1991 | Wirth et al. | |
| 5,020,342 | A * | 6/1991 | Doan et al. | 70/14 |
| 5,165,263 | A | 11/1992 | Perron et al. | |
| 5,167,135 | A * | 12/1992 | Gobeski | 70/14 |
| 5,213,308 | A | 5/1993 | Jeromson et al. | |
| 5,244,101 | A | 9/1993 | Palmer et al. | |
| 5,261,177 | A | 11/1993 | Armstrong | |
| 5,365,757 | A * | 11/1994 | Primeau | 70/14 |
| 5,415,017 | A | 5/1995 | Benda et al. | |
| 5,572,771 | A * | 11/1996 | Kelleghan | 24/170 |
| 5,582,042 | A * | 12/1996 | Mordick | 70/14 |
| 5,598,724 | A | 2/1997 | Primeau | |
| 5,664,597 | A | 9/1997 | Miskiewicz | |
| 5,806,555 | A | 9/1998 | Magno, Jr. | |
| 5,881,582 | A | 3/1999 | Monaco | |
| 6,116,278 | A | 9/2000 | Baumgardner et al. | |
| 6,510,717 | B1 * | 1/2003 | Levi | 70/18 |
| 6,557,384 | B1 * | 5/2003 | Cuesta | 70/14 |
| 6,622,532 | B2 * | 9/2003 | Hsu | 70/14 |
| 6,622,536 | B1 | 9/2003 | Fuller et al. | |
| 6,755,054 | B2 | 6/2004 | Burmesch et al. | |
| 6,997,420 | B2 * | 2/2006 | Yudis et al. | 70/14 |
| 7,000,438 | B1 * | 2/2006 | Cooper et al. | 70/16 |
| 7,121,122 | B2 * | 10/2006 | Levi | 70/18 |
| 7,124,606 | B2 * | 10/2006 | Turek | 70/14 |
| 7,293,438 | B2 * | 11/2007 | Benda | 70/18 |
| 2004/0159133 | A1 | 8/2004 | Marcelle et al. | |

OTHER PUBLICATIONS

International Search Report and Written Opinion from PCT International Appln. No. PCT/US06/22949 dated Aug. 03, 2007, 10 pages.

* cited by examiner

LOCKOUT DEVICE

CROSS REFERENCE TO RELATED APPLICATIONS

This application claims the benefit of U.S. Provisional Patent Application No. 60/689,854, filed Jun. 13, 2005, the entire disclosure of which is hereby incorporated by reference.

FIELD OF THE INVENTION

The present invention relates to a security device and more specifically to a lockout device for an instrument and method of use.

BACKGROUND OF THE INVENTION

Security devices, such as for example, padlocks and other types of conventional locks are known in the art. Many security devices are provided for restricting access to equipment and control instruments, including, for example, electrical components, such as switches, dials and push buttons, and fluid system components, such as valves and pressure regulators. One exemplary security device is a valve lockout device to prevent the operation of a valve, which may be utilized during maintenance of the associated fluid system or under other conditions in which the flow setting of the valve must not be changed.

Valve lockout devices typically restrict movement of the handle attached to a valve stem configured to actuate the valve. These devices generally use a feature to stop, resist, push, or pull against the body of the valve or the conduit attached directly to the valve. There are a number of issues that affect the versatility and functionality of designs of this type. Due to the large number of valve manufacturers and the wide variety of valve sizes, conduit sizes, valve body shapes and valve handle dimensions, the types of valves with which a single device design may be used is limited, requiring retention of several types or sizes of prior art valve lockout devices to accommodate the many types and sizes of valves in service at a typical plant. In addition, the installed position and location of the valve itself can vary. The orientation of the valve (vertical or horizontal) and the clearance of the valve from a wall, piping, or other pieces of equipment will affect the ability of a lockout device to be assembled with a valve.

Moreover, the handle is left attached to the valve in prior art designs. In certain designs, if a lever style handle is attached to a valve and the valve is locked out in any other position except open, the handle extends beyond the envelope of the valve body. In this condition, the valve becomes a moment arm that may be dislodged with sufficient force, compromising the locked out state of the valve.

Valves are primarily locked out for two reasons, for maintenance, or to maintain a necessary process. Because of the nature and methods employed by prior art and currently available devices, failure of these devices could potentially result in a hazardous, life threatening, or catastrophic situation.

SUMMARY OF THE INVENTION

The present invention relates to a lockout device for operable instruments, including fluid systems components, such as, for example, flow regulating, shutoff, and flow switching valves. Many such valves are operable by manual manipulation of an actuating member, such as, for example, a valve stem, which extends from the valve body and may be rotated, pulled, pushed, or otherwise moved to alter the flow of a system fluid through the valve. Examples of such valves include ball valves, gate valves, needle valves, toggle valves, and diaphragm valves. With many valves, a separate valve handle is attached to the actuating member to facilitate movement of the actuating member by providing an extension that is easy to grasp and manipulate. Drawbacks of such a handle are that in circumstances in which lockout of the valve is desired, the size and shape of the handle may limit the type of lockout device with which the valve may be assembled, and in many cases, all or part of the handle may still be accessed, presenting opportunities for tampering or accidental impact with the handle. By providing a lockout device that is adapted to assemble over the valve actuating member after the handle is removed, both of these drawbacks are eliminated. In one embodiment of the present invention, a valve lockout device is provided with a cover for restricting access to the valve actuating member, and a flexible member attached to the cover that may be tightened around the valve body to secure the cover to the valve.

BRIEF DESCRIPTION OF THE DRAWINGS

Further features and advantages of the invention will become apparent from the following detailed description made with reference to the accompanying drawings, wherein.

DETAILED DESCRIPTION OF THE INVENTION

This Detailed Description of the Invention merely describes embodiments of the invention and is not intended to limit the scope of the claims in any way. Indeed, the invention as described by the claims is broader than and unlimited by the preferred embodiments, and the terms in the claims have their full ordinary meaning.

The present invention provides a lockout device for preventing access to or operation of an instrument, such as, for example, a valve, by covering an actuating member extending from the instrument to restrict access to the actuating member. In one embodiment, the lockout device may include a cover and a flexible member attached to the cover that may be tightened around the instrument to secure the cover over the actuating member. The device may be provided with one or more of the novel design features disclosed herein to provide improved adaptability, security, safety and/or convenience. For example, a device according to the present invention may be adapted for assembly with different types and sizes of valves. In some applications, the lockout cover of the present invention may be sized to cover the valve with a handle still assembled to the valve, particularly if a smaller handle is used with the valve, such as a knob handle or plunger-style handle. In other applications, the valve handle may be disassembled from the actuating member prior to installation of the valve lockout device. In one such application, a storage compartment, such as a bag or pouch, may be provided with the lockout device for local storage of the removed valve handle and any related hardware.

In one embodiment according to the present invention, a lockout device may include a flexible member, such as a locking strap, for tightening around the valve body to secure a cover to the valve body to block access to the valve's actuating member. The flexible member may be provided with a length sufficient to accommodate valve bodies of varying sizes. As another example, the device may include a base and a cover, between which a portion of the flexible member may be cinched to prevent loosening of the flexible member. As yet another example, the device may include a mechanism to lock the base and cover together to maintain a cinched condition of the flexible member until the mechanism is unlocked and the cover is separated from the base.

FIGS. 1A-10 illustrate a lockout device 10 according to an exemplary embodiment of the invention. It should be noted that some components of the illustrated embodiment have been omitted from some of the figures to more clearly illustrate certain features of the invention. It should also be noted that other embodiments of the invention may contain some, but not all, of the features disclosed.

While the figures and descriptions illustrate and describe an embodiment adapted for use with a valve, many of the features of the exemplary embodiments may be used with lockout devices for different types of instruments, such as, for example, electrical controls. The device is beneficial for many applications where an instrument must be locked, such as, for example, in applications where maintenance personnel are servicing a fluid system or factory equipment with which a fluid system is connected, where an instrument, such as a valve, is known to be faulty, or where a control setting must not be altered. As one example, the device can be used to lock a valve in a desired flow setting or position, such as, for example, open, closed, or a set flow rate, by use of a conventional locking type device or locking member, such as, for example, a padlock, hasp, cable or similar object. Applications may include permanent and temporary lockouts. The devices according to the present invention are durable under normal use and may be used indefinitely.

Figure 2A:
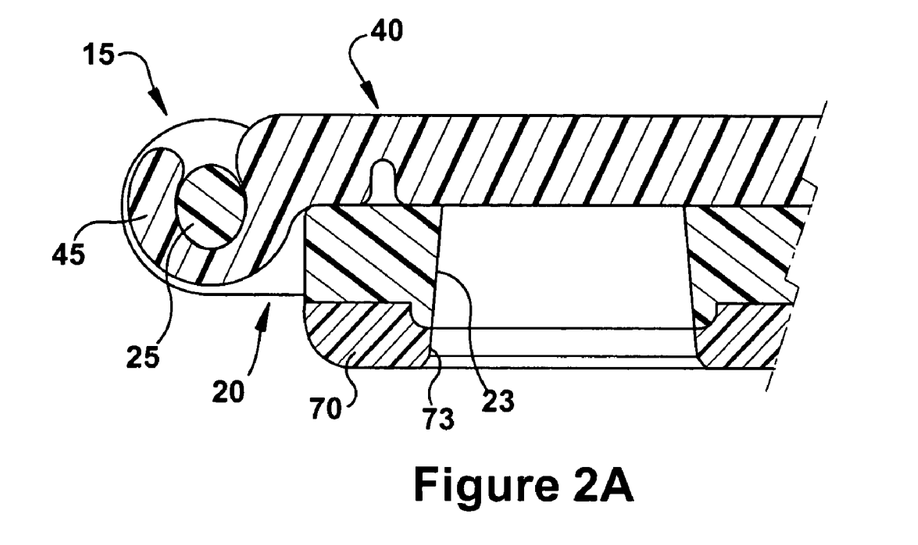
FIG. 2A is a side cross-sectional view of the hinge portion of the lockout device of FIG. 1A in a lockout position.
Figure 2B:
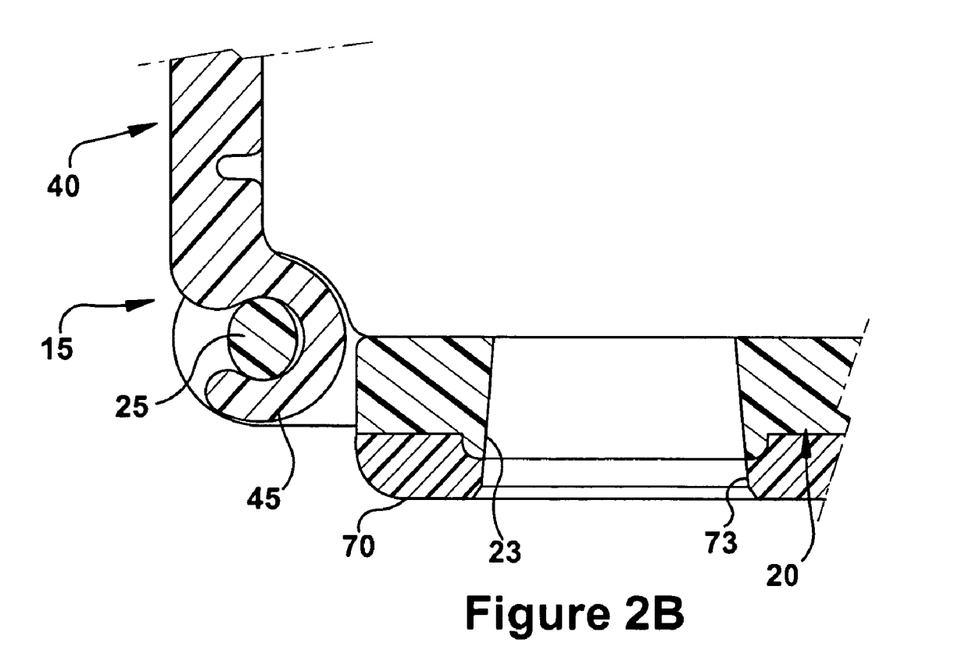
FIG. 2B is a side cross-sectional view of the hinge portion of the lockout device of FIG. 1A in an open position.

The device 10 of the illustrated embodiment includes a latch base bottom or bottom member 20 and a latch base cover or cover member 40. According to the present invention, the cover member and bottom member may be attached or attachable to each other in one of may different ways, such as, for example, interlocking slots and tabs, fasteners, or a flexible web between base and cover member portions of a one-piece design. Another embodiment of the present invention may rely on the installation of a padlock or other locking member to secure the separate cover member to the bottom member. In the illustrated embodiment, the cover member 40 is hinge mounted to the bottom member 20 at a hinge portion 15, such that the cover member 40 may pivot with respect to the bottom member 20, between an open position and a closed or lockout position. In one embodiment, the hinge portion may include a hinge pin on one of the cover member and the bottom member, and a hinge leaf on the other of the cover member and the bottom member. Either one or both of the hinge pin and hinge leaf may be provided with an elliptical cross section, such that when the cover member is pivoted to the open position, the elliptical hinge pin and/or hinge leaf act to bias the cover member to remain in the open position. In the illustrated embodiment, as shown in FIG. 2, the bottom member 20 is provided with an elliptical hinge pin 25, and the cover member 40 is provided with an elliptical hinge leaf 45.

Figure 1A:
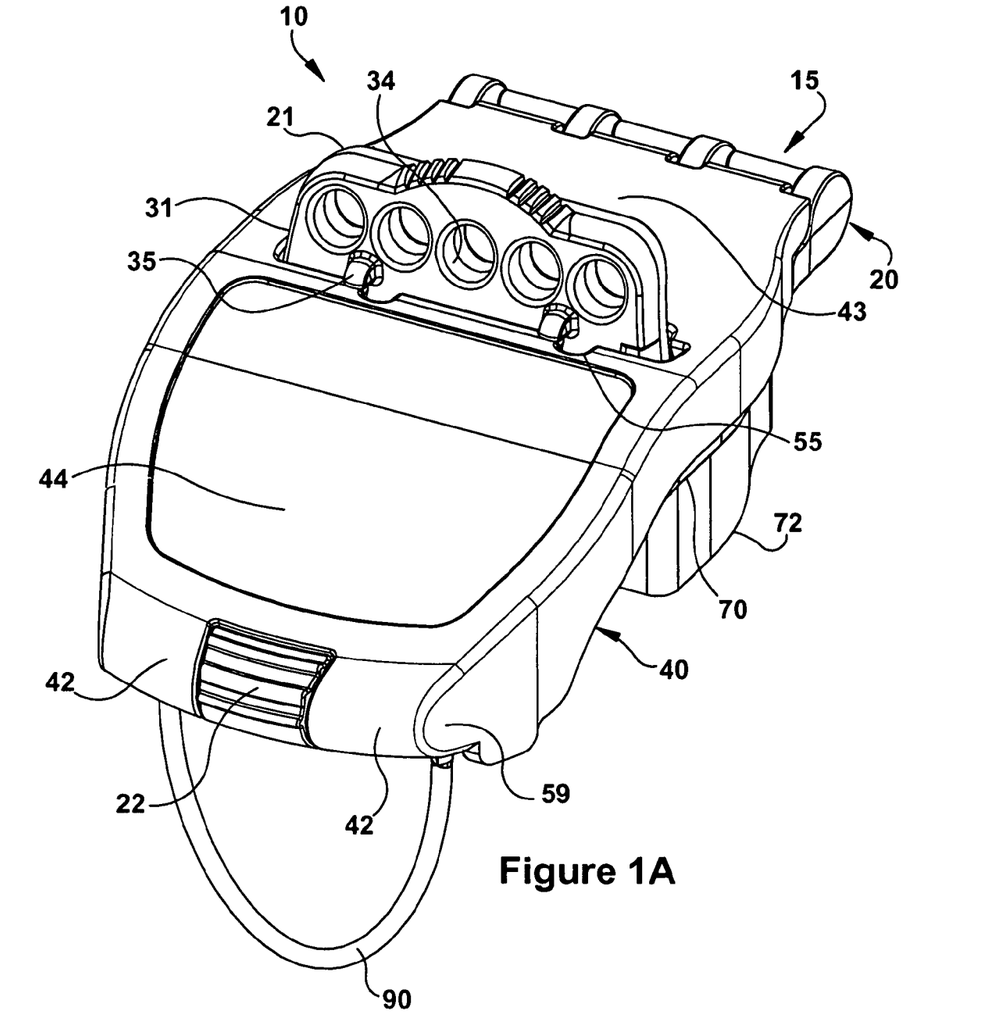
FIG. 1A is a perspective view of a lockout device in a closed or lockout position, with a flexible member portion omitted for clarity.
Figure 1B:
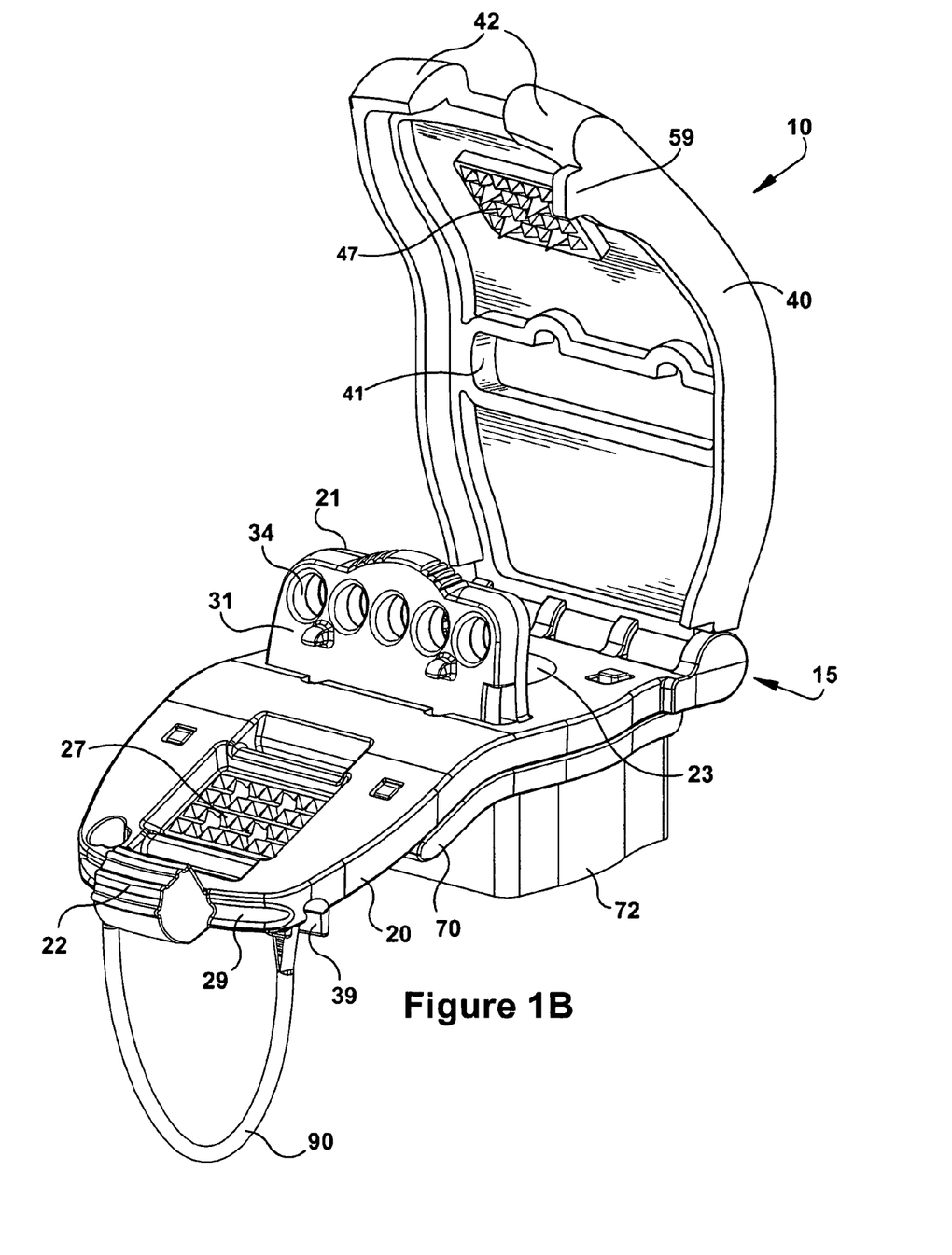
FIG. 1B is a perspective view of the lockout device of FIG. 1A in an open position.
Figure 1C:
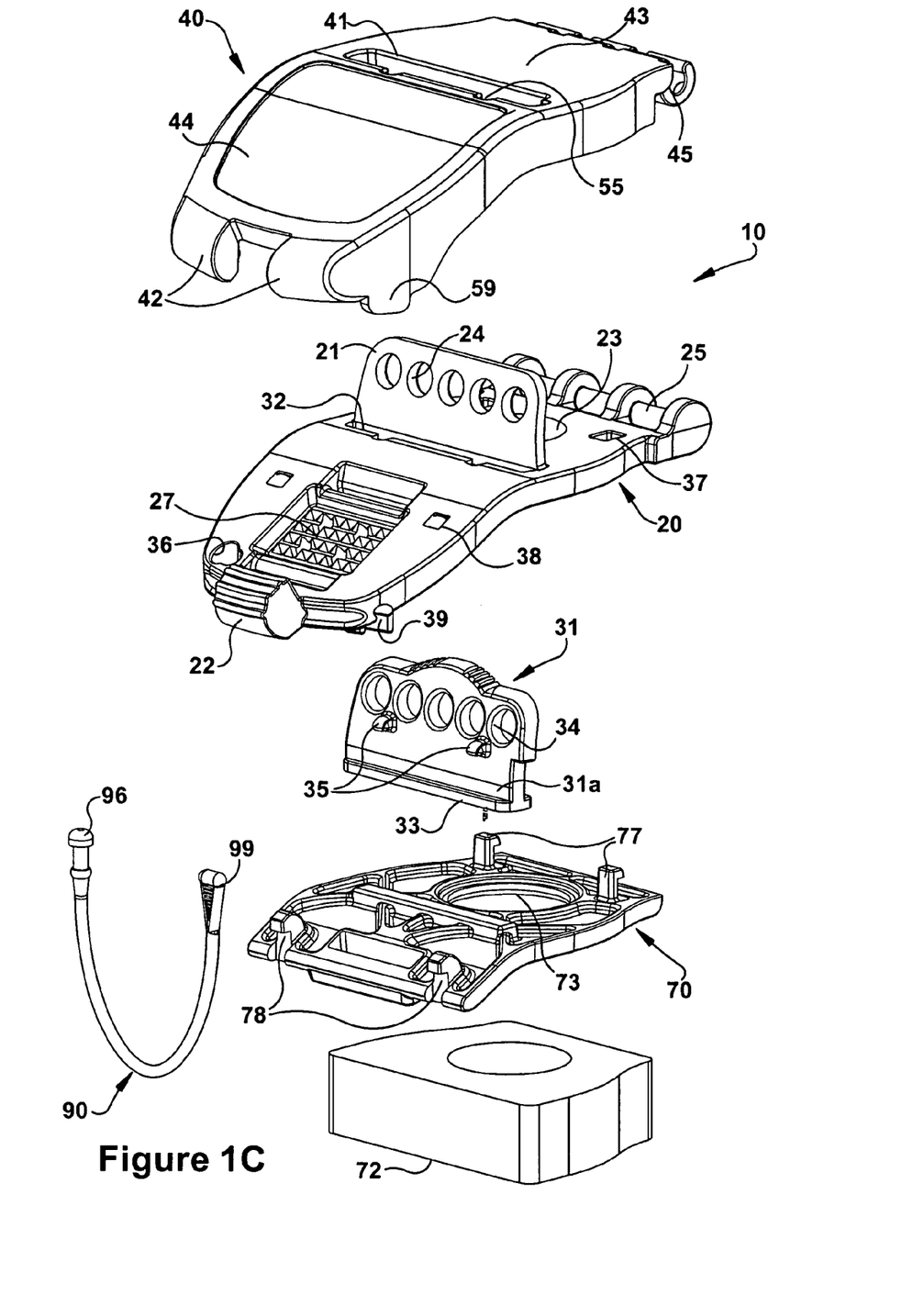
FIG. 1C is an exploded perspective view of the cover portion of the lockout device of FIG. 1A.

The cover member 40 includes a covering portion 43 which covers an opening 23 in the bottom member 20, shown in FIGS. 1A and 1B, in the lockout position. The opening 23 may be sized to receive an actuating member extending from a side of the valve body, such that closure of the cover member will selectively restrict access to the actuating member, while allowing access to the actuating member when the cover member is opened. While the illustrated covering portion 43 is a flat surface, the covering portion may also be provided with an upward contoured or cup-shaped surface to receive the endmost portion of the actuating member, or with any other surface suitable for accommodating the actuating member.

While many materials may be used to construct the bottom member and cover member, a resilient and durable plastic material may be chosen to provide flexibility to accommodate a durable, snap fit engagement between the bottom member and the cover member. In one embodiment, the bottom member may be provided in 5% glass filled polypropylene. In another embodiment, at least the covering portion 43 of the cover member 40 is provided in a transparent material, such as, for example, a clear or tinted plastic material, to provide visibility of an upper surface of the actuating member when the cover member 40 is in the lockout position. As the actuating member or valve stem of many types of valves provides a visual indication of the position of the position of the valve, such as directional markings or positioned stem flats, visibility of the actuating member during lockout may allow the user to quickly ascertain the position or setting of the valve. One example of such a material is PC Lexan 920A. The cover member 40 may also be provided with a display surface 44 upon which labels containing warnings, safety instructions or other indicia may be placed, which may further identify the position or condition of the valve.

Figure 3A:
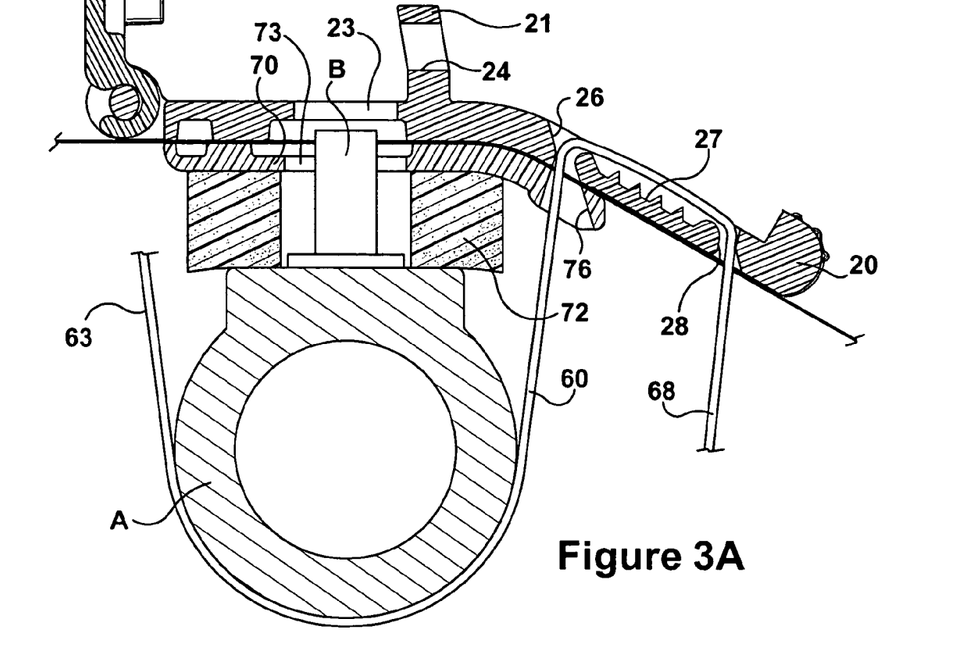
FIG. 3A is a partial side cross-sectional view of the lockout device of FIG. 1A in an open position, shown with a locking strap and assembled with a valve.
Figure 3B:
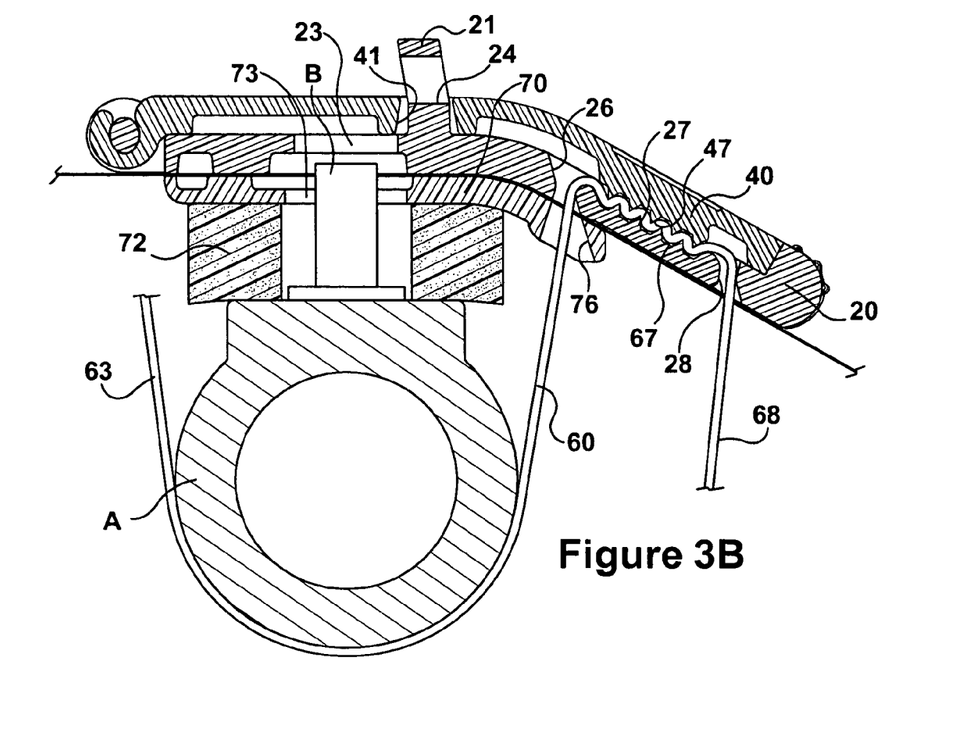
FIG. 3B is a partial side cross-sectional view of the lockout device of FIG. 1A in a lockout position, shown with a locking strap and assembled with a valve.
Figure 4:
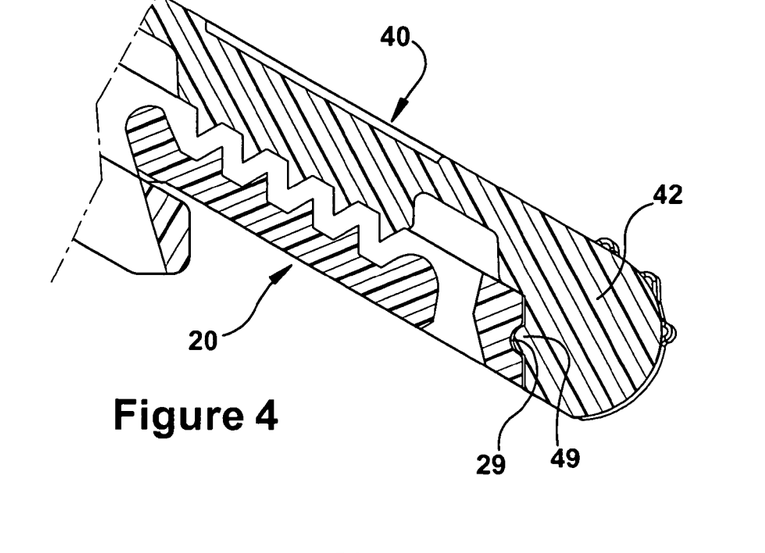
FIG. 4 is a side cross sectional view of a detent portion of the lockout device of FIG. 1A in a closed position.
Figure 5:
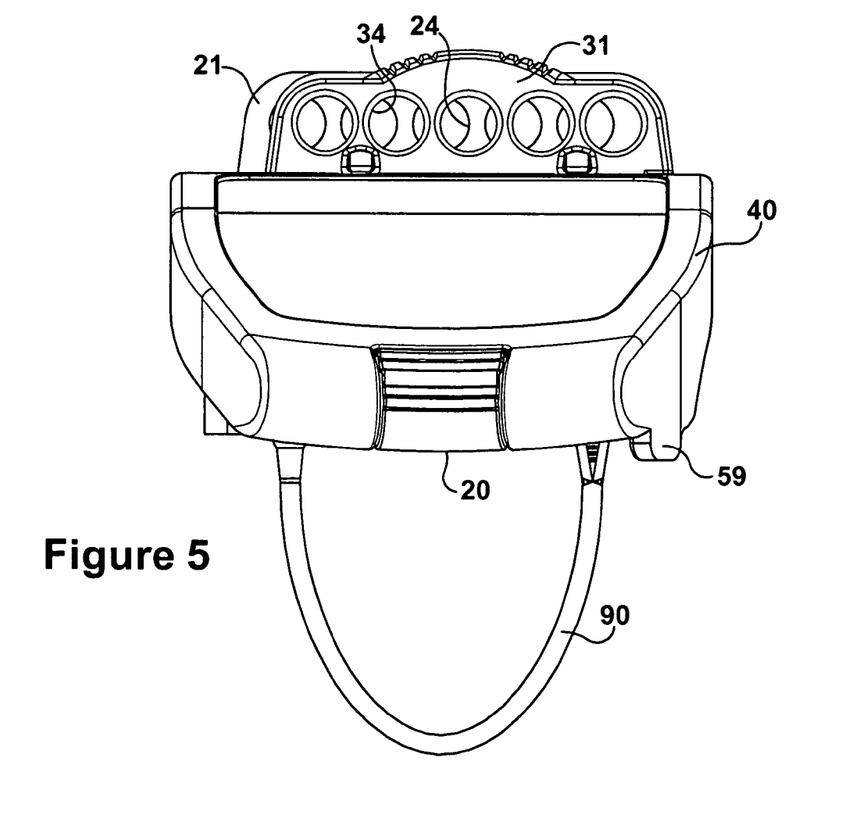
FIG. 5 is a front view of the lockout device of FIG. 1A with the movable lock bar in an unlocking position.
Figure 6A:
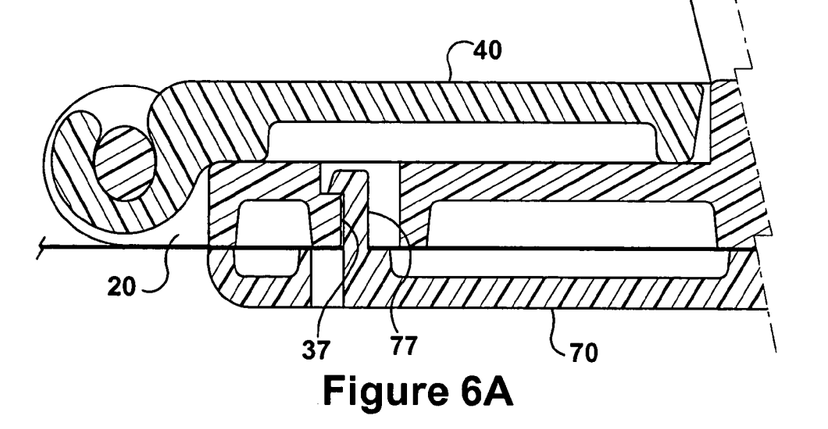
FIG. 6A is a side cross-sectional view of a mounting member and bottom member attachment portion of the lockout device of FIG. 1A.
Figure 6B:
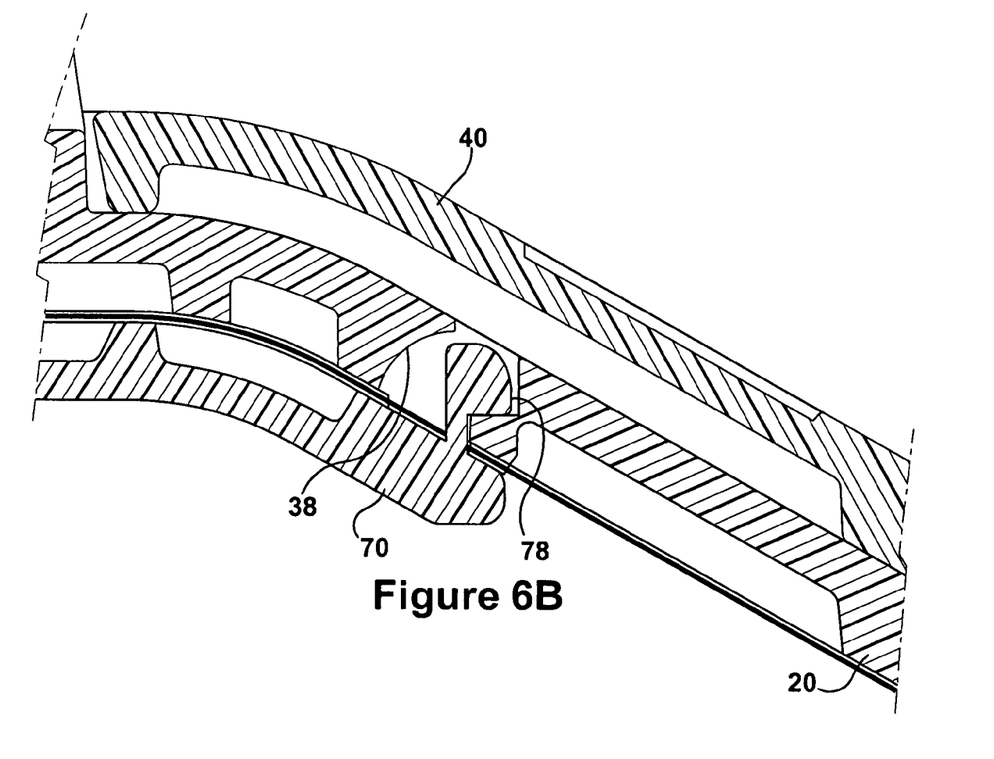
FIG. 6B is a side cross sectional view of another mounting member and bottom member attachment portion of the lockout device of FIG. 1A.
Figure 7:
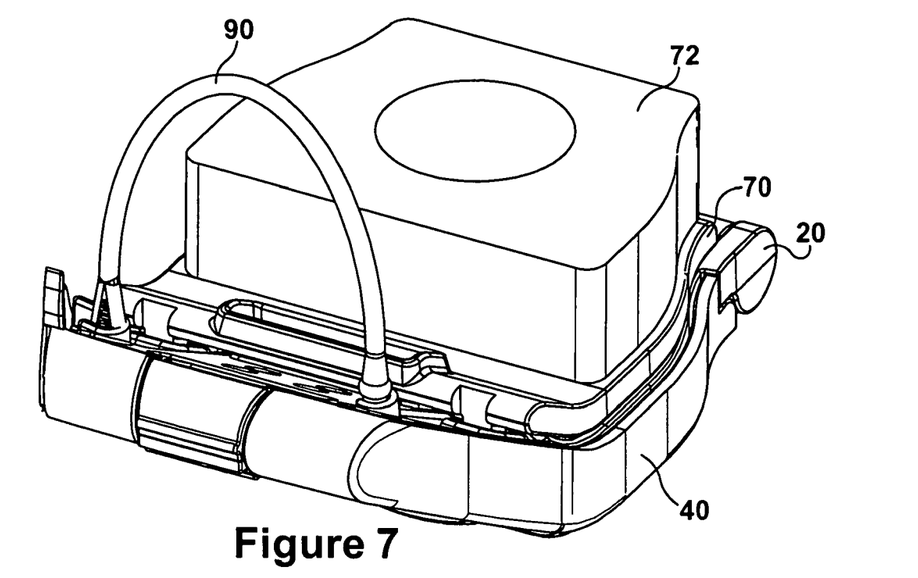
FIG. 7 is a bottom perspective view of the lockout device of FIG. 1A.

According to the present invention, the lockout device includes a flexible member, such as, for example, a strap, cable, chain, or rope, that may be attached to the cover, tightened around a portion of the instrument, such as the body of a valve, and secured to the cover at a separate portion of the flexible member to secure the cover on the instrument. In one embodiment, a cinch strap or locking strap is directly or indirectly connected at one end to one of a bottom member and a cover member, such that the strap may be tightened around a valve body to secure the bottom member and cover member over an actuating member extending from the valve body, with a portion of the strap being secured between the bottom member and the cover member to prevent loosening of the strap. In the illustrated embodiment, as shown in FIGS. 3A and 3B, a locking strap 60 is indirectly connected at a first end 63 to the bottom member 20, as discussed in greater detail below. The locking strap 60 is sized to be a sufficient length to be tightened around valve bodies of a wide range of sizes and shapes. For example, the lockout device may be provided with a locking strap approximately 36 inches in length to accommodate most valves in ⅜" to 4" piping systems. While the flexible member may be provided in many different material to accommodate a variety of applications, a durable and flexible plastic material may be chosen to withstand repeated use and high tension forces. In one embodiment, the strap is provided in 100% polypropylene fibers.

The bottom member and the cover member of the lockout device may be provided with opposed holding portions adapted to hold or cinch a portion of a locking strap between the two holding portions when the cover member is in the lockout position, preventing the cinched portion of the strap from moving and preventing the locking strap from being loosened from the valve body during lockout. The opposed holding portions may take a number of different forms, including, for example, opposed frictional surfaces, interlocking teeth, holes aligned with spikes, or a combination of any of these and other such features. In the illustrated embodiment, as shown in FIG. 1B, the bottom member and cover member holding portions include mating cinch pads 27, 47 having interlocking diamond-shaped patterns that abut each other when the cover member is in the closed position. The holding portions may be adapted to engage locations between woven threads in the strap to more tightly secure the strap, and in some applications, may pierce the weave of the strap to more aggressively cinch and secure the strap. Further, according to one embodiment of the invention, one holding portion may be raised and the opposite holding portion may be recessed, thereby causing the cinched strap to become crimped between the bottom member and cover member to better secure the cinched portion of the locking strap. In the illustrated embodiment, as shown in FIGS. 3A and 3B, the bottom member holding portion 27 is recessed and the cover member holding portion 47 is raised to provide a crimped condition in the cinched portion 67 of the locking strap 60.

To receive the flexible member between the bottom member and the cover member for cinching, slots of various shapes and sizes may be provided in either or both of the bottom member and cover member. In the illustrated embodiment, first and second or entry and exit strap slots 26, 28 are provided in the bottom member 20 on either side of the holding portion 27, such that the locking strap 60 may be inserted up through entry slot 26, stretched over the holding portion 27, and inserted back down through exit slot 28. The slots 26, 28 may be positioned such that the free end 68 of the strap 60 extending from exit slot 28 may be easily pulled to tighten the strap 60 against the valve body A.

According to the present invention, the lockout device may be provided with a mechanism for locking the cover member and bottom member together in the closed or lockout position, to prevent unauthorized operation of the locked out valve. One example of such a mechanism is a flange or plate extending from the device, including one or more apertures, such as holes or slots, through which one or more locking members, such as a padlock or cable, may be inserted to obstruct movement of the cover member from the lockout position. In the illustrated exemplary embodiment, best seen in the exploded view of FIG. 1C, the bottom member 20 includes a protruding lock bar 21 that defines five locking apertures 24 adapted to receive a padlock shackle or other such locking member. The availability of multiple locking apertures 24 allows for the use of multiple locking members to provide added security against unauthorized use of the valve. While the lock bar 21 of the illustrated embodiment extends from a generally central portion of the bottom member 20 through an opening 41 in the cover member 40 when the cover member 40 is closed, it should be noted that the lock bar may be provided on many different surfaces and locations of the bottom member to extend past many different portions of the cover member, including outer edges of the cover member, such that the inserted locking member will block movement of the cover member from the lockout position. Further, the lock bar need not be integral to the bottom member, as it may be attached to the bottom member in some other fashion.

According to the present invention, the lockout device may also be provided with additional features or mechanisms separate from the lock aperture for retaining the cover member in the closed or lockout position. Examples of such mechanisms include snap-fit mating surfaces, clasps, fasteners, or other such components. In one embodiment, mating surfaces of the bottom member and cover member may be provided with one or more detents and corresponding detent sockets to provide a snap-fit engagement between the bottom member and the cover member in the lockout position. In the illustrated embodiment, as shown in the cross-sectional view of FIG. 4, the bottom member 20 is provided with a pair of elongated detent sockets 29, and the cover member 40 is provided with a corresponding pair of elongated detents 49, which snap into the detent sockets 29 when the cover member 40 is in the lockout position. This snap fit allows the strap 60 to remain cinched between the holding portions 27, 47 while an operator prepares to lock the valve lockout device in the lockout position, by using a padlock with the lock bar 21, for example. Further, as shown in the illustrated embodiment (FIG. 1A), the bottom member 20 and cover member 40 may be provided with interlocking finger and thumb release pads 42, 22 to assist a user in opening and closing the lockout device 10.

In another exemplary embodiment of the invention, the lockout device may be provided with a clasp-type member that is movable to a locking position to secure the cover member against the bottom member for lockout. In one embodiment, the clasp-type member may be assembled with the bottom member to extend past the cover member when the cover member is in the closed position. The clasp-type member may include one or more retaining protrusions that align with one or more corresponding notches in the cover member when the clasp-type member is in an unlocking position to allow the protrusions to pass through the notches during closure of the lockout device. When the clasp-type member is then moved to a locking position, the protrusion becomes misaligned with respect to the corresponding notch, and the protrusion contacts a portion of the cover member to prevent the cover member from being moved to an open position.

In the illustrated embodiment, the clasp-type member includes a second, movable lock bar or slide bar 31 inserted through a lock bar slot 32 (see FIG. 1C) adjacent to the first lock bar 21 in the bottom member 20, and retained with the bottom member by a base flange 33. The slot 32 is longer than the contained portion 31a of the movable lock bar 31, allowing the movable lock bar 31 to slide within the slot 32 between an unlocking position at one end and a locking position at the opposite end. In the unlocking position, shown in the front view of FIG. 5, protrusions 35 extending from a front surface of the movable lock bar 31 align with corresponding notches 55 in the cover member 40, allowing the movable lock bar 31 to be received through the cover member opening 43 during closure of the lockout device 10. Upon closure, the movable lock bar 31 may be slid into the locking position, causing the protrusions 35 to misalign with the notches 55, such that the protrusions 35 secure the cover member 40 against the bottom member 20. Further, the movable lock bar 31 may include one or more alignment apertures 34 that align with the corresponding one or more locking apertures 24 in the first lock bar 21 when the movable lock bar 31 is in the locking position. The insertion of a locking member, such as a lock shackle, through the aligned locking and alignment apertures 24, 34 to lock out the valve prevents the movable lock bar 31 from being slid to the unlocking position, thereby providing an additional safeguard against movement of the cover member 40 from the closed position during valve lockout. While many materials may be used to construct the movable lock bar, a durable plastic material may be chosen to resist tampering. In one embodiment, the movable lock bar is provided in 5% glass filled polypropylene.

To assemble a valve lockout device with a valve, a bottom member may be affixed directly or indirectly with the valve body, with the actuating member of the valve being received in an opening in the bottom member. In one embodiment, the valve lockout device may be provided with a mounting member that is connectable with the bottom member to mount the bottom member to the valve body. In the illustrated embodiment, a back plate or mounting member 70 is attached to the bottom member 20 for mounting the bottom member 20 to the valve body. The mounting member 70 is provided with an opening 73 that aligns with the bottom member opening 23 to receive the actuating member B therethrough, as shown in FIGS. 3A and 3B. Many different mechanisms may be used to attach the mounting member to the bottom member, such as, for example, fasteners, adhesives, interlocking engagements. In the illustrated embodiment shown in FIGS. 6A and 6B, flexible fingers or snaps 77 and hooks 78 extending from the mounting member 70 engage corresponding attachment slots 37, 38 in the bottom member 20 for a snap-fit engagement between the bottom member 20 and the mounting member 70. The mounting member 70 may serve to support and align the base flange 33 of the movable lock bar 31. The mounting member 70 may also be provided with a strap slot 76 that aligns with the corresponding bottom member exit slot 26 to allow insertion of the locking strap 60. As shown in FIGS. 3A and 3B, the mounting member strap slot 76 may be tapered outward to facilitate insertion of the strap 60. While many materials may be used to construct the mounting member, a resilient and durable plastic material may be chosen to provide flexibility to accommodate a snap fit engagement with the bottom member and thermal resistance to enable use with valves exposed to extreme temperatures. In one embodiment, the mounting member is provided in 5% glass filled polypropylene.

The mounting member may be provided with a mounting surface to securely engage the mating surface of the valve body. In the illustrated embodiment, as shown in the bottom perspective view of FIG. 7, the mounting surface includes a cushion pad 72 surrounding the mounting member opening 73 (see FIGS. 3A and 3B). The cushion pad 72 may be provided in a soft and/or compressible material, such as, for example, a closed cell foam material, such as EPDM (ethylene propylene diene monomer) foam rubber. During installation with the valve body, the cushion pad 72 may therefore deform to conform with the shape of the valve body, providing improved stability for the lockout device 10 and a tighter fit between the mounting member 70 and the valve body. The compressible cushion pad 72 also provides the user with a tactile cue when tightening the locking strap 60, as the "bottoming out" of the cushion pad 72 against the valve body during tightening will provide a noticeable increase in tension in the locking strap 60.

Figure 8:
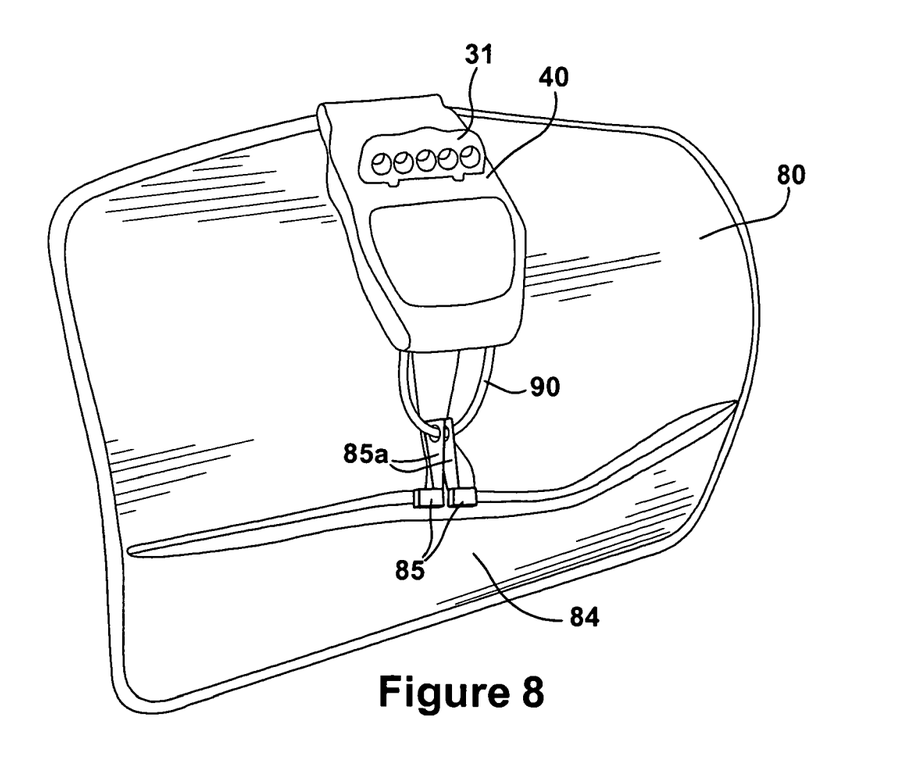
FIG. 8 is a perspective view of the lockout device of FIG. 1A assembled with a valve enclosure.
Figure 9A:
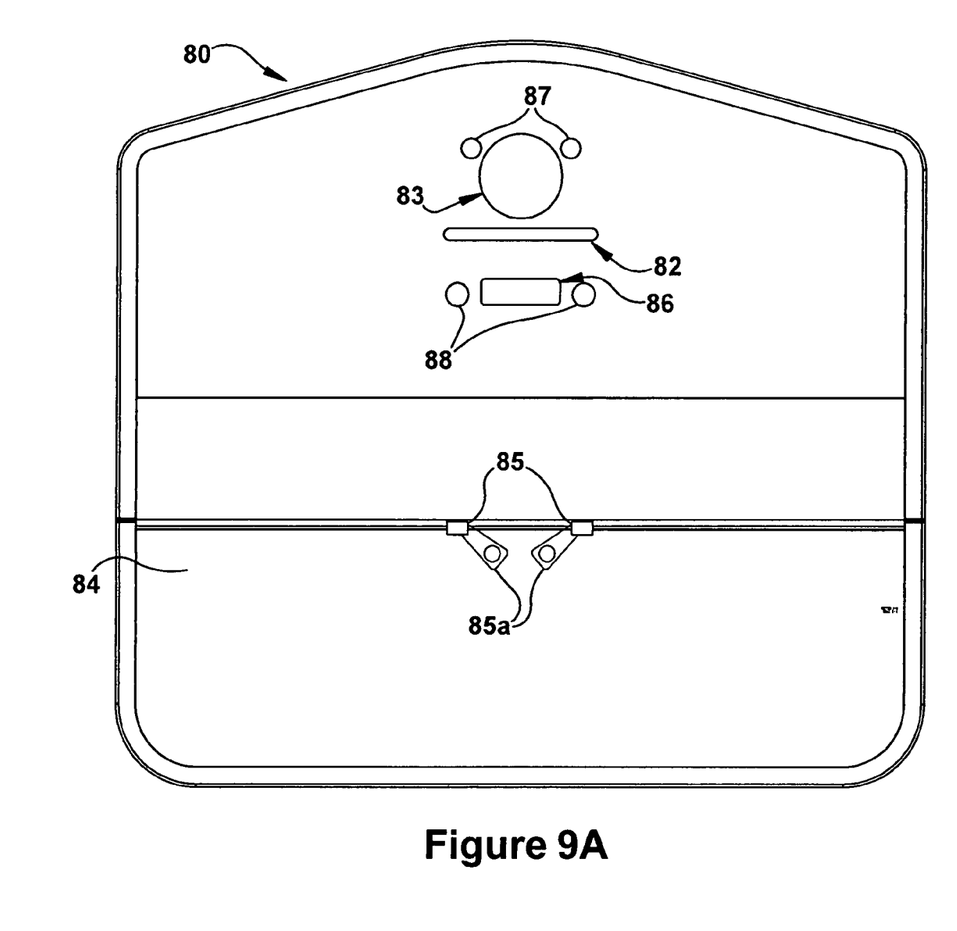
FIG. 9A is a front view of the enclosure of FIG. 8.
Figure 9B:
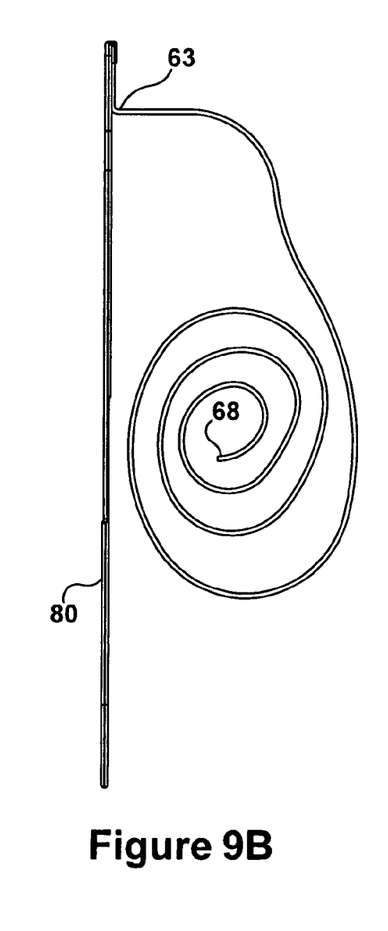
FIG. 9B is a side view of the enclosure of FIG. 8 with a locking strap.
Figure 10:
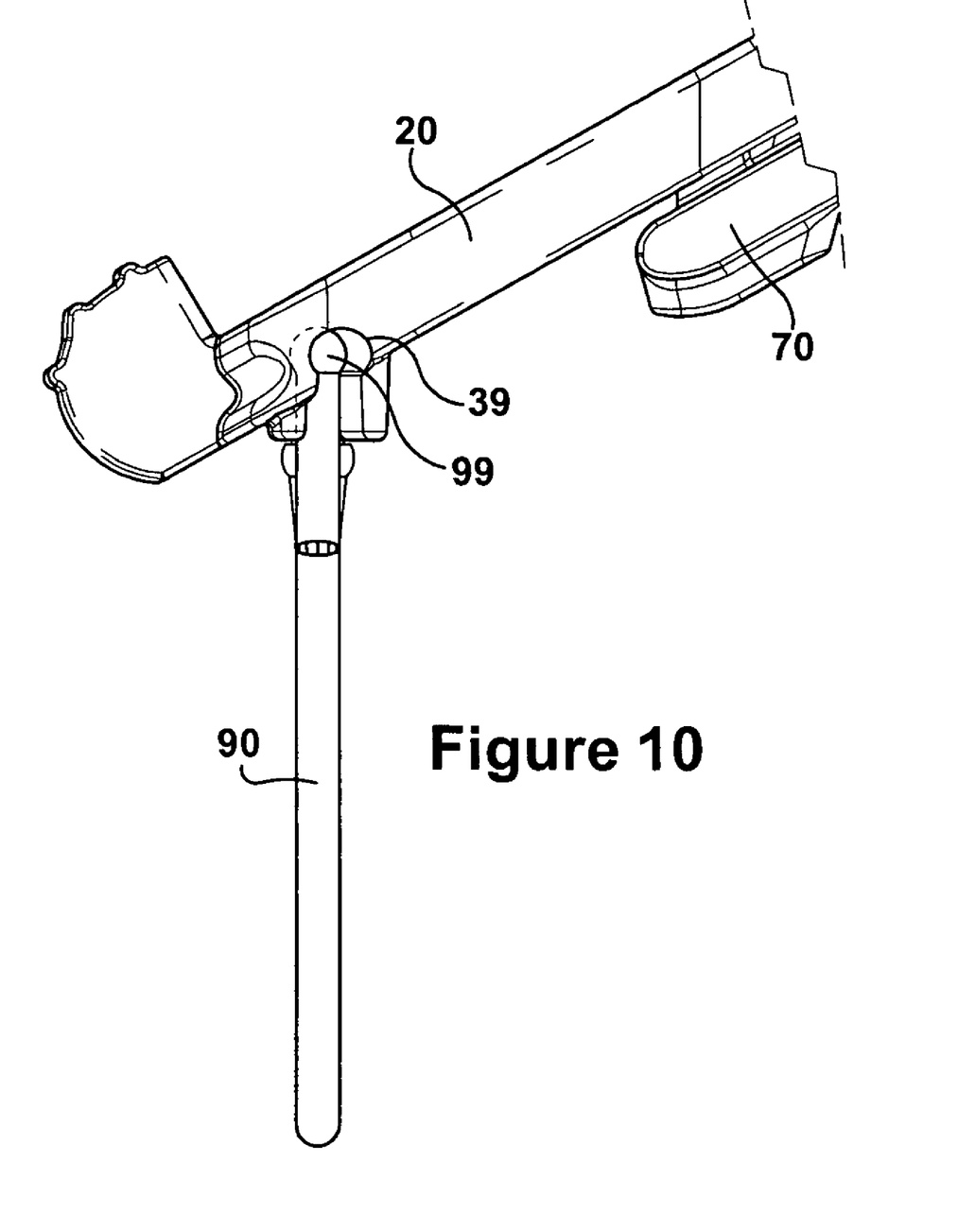
FIG. 10 is a side perspective view of the lanyard slot portion of the lockout device of FIG. 1A.

To further identify a valve's locked out condition and/or to further obstruct access to the locked out valve, the lockout device may be provided with an additional enclosure that covers the valve when the lockout device is assembled with the valve. The enclosure may take many different forms, such as, for example, a tube shaped enclosure through which the fluid system conduits can extend, or a sheet-type enclosure adapted to cover at least a portion of the valve body. In one embodiment, the enclosure may be provided in a flexible material for covering valves of varying shapes and sizes. The enclosure may be connected to a lower surface of a bottom member, such that the enclosure is disposed between the bottom member and the valve body when the lockout device is installed. In the illustrated embodiment, as shown in FIG. 8, the lockout device is provided with a durable sheet enclosure or bag portion 80 secured between the bottom member 20 and the mounting member 70. The exemplary enclosure is attached to the first end 63 of the locking strap 60, as shown in FIG. 9B, to provide a connection between the locking strap end 63 and the bottom member 20. As shown in FIG. 9A, the exemplary enclosure 80 includes several openings 82, 83, 86, 87, 88 to allow a portion of the enclosure 80 to be positioned between the mounting member 70 and the base member 20. An opening 82 that aligns with the lock bar slot allows the movable lock bar 31 to be received through the lock bar slot 32. An opening 83 that aligns with the bottom member and mounting member openings 23, 73 allows the actuating member to be received through the mounting member and bottom member openings 73, 23. An opening 86 that aligns with the strap slots 26, 76 allows the locking strap 60 to be inserted through the strap slots 26, 76. Openings 87, 88 that align with the attachment slots 37, 38 allow the bottom member 20 to attach to the mounting member 70. While many materials may be used to construct the enclosure, a durable plastic sheet material, such as a vinyl coated fabric may be chosen to provide durability and thermal resistance.

The enclosure may serve many functions, including, for example, providing identification of the locked out condition or the reason for lockout, providing markings showing illustrated or written instructions for installation and/or removal of the lockout device, covering the valve body to further obstruct access to the locked out valve, or providing a compartment for service instructions, valve or other fluid system components, or other items. In one embodiment, a closeable compartment may be provided for storing items, such as, for example, a handle detached from a valve prior to valve lockout and any mounting hardware used to assemble the handle to the actuating member, such as a valve stem nut or set screw. In the illustrated embodiment, a storage pocket 84 is provided with a pair of zippers 85 for closure of the pocket. This arrangement provides for local and convenient access to the detached handle and mounting hardware when the locked out valve is to be returned to operation, while minimizing the risk of the valve handle and mounting hardware being lost during valve lockout.

The enclosure compartment may be locked closed to further minimize the likelihood of valve tampering or loss of the valve handle. Many mechanisms may be used to lock the compartment closed, such as the insertion of a padlock, cable or other locking member through openings in an open end of the compartment or through holes in the tabs of one or more zippers. In one embodiment, a lanyard may be provided with both ends attachable to the lockout device, such that the lanyard may be inserted through two zipper pulls or zipper tabs to hold the zippers together to prevent the compartment from being opened. In the illustrated embodiment, a flexible lanyard 90 is provided with an enlarged anchor end 96 retained in a countersunk hole or anchor pocket 36 in the bottom member 20, and a flanged free end 99 receivable in a complementary shaped lanyard slot or receiver pocket 39 in the bottom member 20. To lock the pocket 84 closed, the zippers 85 are pulled together and the free end 99 of the lanyard 90 is inserted through the zipper tabs 85*a*. The free end 99 is then inserted into the lanyard slot 39. When the cover member 40 is pivoted to the closed position, a side wall 59 on the cover member 40 covers the lanyard slot 39, thereby retaining the free end 99 of the lanyard 90 until the cover member 40 is returned to the open position. By using this mechanism, the pocket 84 remains locked closed as long as the lockout device 10 is in the lockout condition, and the pocket 84 may be opened, and the valve handle and/or other items accessed, as soon as the lockout device 10 is unlocked. While many materials may be used to construct the lanyard, a resilient and flexible plastic material may be chosen for ease of use. In one embodiment, the lanyard may be provided in low density polyethylene.

To use the exemplary valve lockout device 10 illustrated in FIGS. 1A-10 according to one exemplary method, the valve is first set to the desired condition for lockout, such as, for example, closed, open, or regulated flow (partially open) positions, by using the valve handle to manipulate the actuating member to achieve the desired valve condition. The handle is then removed from the actuating member, along with any associated mounting hardware. The valve handle and associated mounting hardware are placed in the pocket 84, and the zippers 85 are pulled together to close the pocket 84. The valve lockout device 10 is placed over the valve body such that the actuating member B is received in aligned openings 73, 23 in the mounting member 70 and bottom member 20, and the cushion pad 72 is pressed against the upper surface of the valve body. The free end 99 of the lanyard 90 is inserted through the zipper tabs 85*a* and slid into the lanyard slot 39 in the bottom member 20.

The locking strap 60 is wrapped around the valve body A, inserted through aligned strap slots 76, 26 in the mounting member 70 and bottom member 20, stretched across the bottom member holding portion 27, and inserted down through bottom member exit slot 28. The free end 68 of the locking strap 60 is pulled to tighten the strap around the valve body until an increase in tension is felt, resulting from the cushion pad 72 bottoming out against the valve body A. With the movable lock bar 31 in the unlocking position, the cover member 40 is pivoted from the open position to the lockout position with the first lock bar 21 and the movable lock bar 31 being received through the cover member opening 41, and the movable lock bar protrusions 35 being received through the notches 55. The detents 49 of the cover member 40 snap into engagement with the detent sockets 29 of the bottom member 20 to hold the cover member 40 in the closed position, and a portion 67 of the locking strap 60 between the bottom member 20 and the cover member 40, is cinched between opposed holding portions 27, 47.

The movable lock bar 31 is moved from the unlocking position to the locking position, causing the alignment apertures 34 to align with the locking apertures 24, and causing the protrusions 35 to misalign with the notches 55, thereby securing the cover member 40 in the lockout position. A locking member, such as a padlock, is inserted through aligned locking and alignment apertures 24, 34 and is locked to maintain the insertion, which prevents movement of the cover member 40 to the open position both by obstructing withdrawal of the lock bars 21, 31 from the cover member opening 41, and by preventing sliding movement of the movable lock bar 31 to the unlocking position.

While several embodiments of the invention have been illustrated and described in considerable detail, the present invention is not to be considered limited to the precise constructions disclosed. Various adaptations, modifications and uses of the invention may occur to those skilled in the arts to which the invention relates. The invention is intended to cover all such adaptations, modifications and uses falling within the scope or spirit of the claims filed herewith.

What is claimed is:

1. A lockout device for an instrument having a body and an actuating member extending from the body for operating the instrument, the lockout device comprising:

a bottom member, adapted to be positioned over the body, the bottom member including a first holding surface and an aperture for receiving the actuating member;

a cover member connectable to the bottom member for pivotable movement between a closed position and an open position, the cover member including a covering portion for covering the actuating member in the closed position, and a second holding surface adapted to abut the first holding surface in the closed position; and a flexible member having a first end connected to one of the bottom member and the cover member, wherein the bottom member and cover member are adapted to receive a cinching portion of the flexible member between the first and second holding surfaces;

wherein when the flexible member is wrapped around a portion of the body and received between the first and second holding surfaces and the cover member is in the closed position, the first and second holding surfaces prevent movement of the cinching portion of the flexible member in a direction substantially parallel to the first and second holding surfaces;

further wherein the bottom member further comprises a lock bar including at least one locking aperture, and further wherein when the cover member is in the closed position, the insertion of a locking member through the at least one locking aperture prevents movement of the cover member from the closed position to the open position;

further wherein the cover member further comprises an opening for receiving the lock bar therethrough in the closed position; and further wherein the lockout device further comprises a second lock bar connected to the bottom member, the second lock bar being movable between a locking position and an unlocking position and including at least one alignment aperture, wherein the at least one alignment aperture aligns with the at least one locking aperture of the first stated lock bar in the locking position to permit insertion of a locking member therethrough, and further wherein the locking member impedes movement of the cover member from the closed position to the open position when the locking member is in the locking position.

2. The lockout device of claim 1, wherein the second lock bar is adapted to extend through the cover member opening in the closed position and is slideable between the locking position and the unlocking position, wherein the lock bar slide includes at least one protrusion, and the at least one protrusion aligns with at least one corresponding notch in the cover member in the unlocking position to permit movement of the cover member from the closed position to the open position.

3. The lockout device of claim 1, wherein the cover member is pivotally connected to the bottom member at a hinge portion.

4. The lockout device of claim 3, wherein the hinge portion comprises a hinge pin on one of the cover member and the bottom member, and a hinge leaf on the other of the cover member and the bottom member, further wherein at least one of the hinge pin and the hinge leaf has an elliptical cross section for biasing the cover member to remain in the open position when the cover member is moved from the closed position to the open position.

5. The lockout device of claim 1, further comprising at least one detent on one of the cover member and the bottom member, and at least one corresponding detent socket on the other of the cover member and the bottom member, wherein the at least one detent engages the at least one detent socket when the cover member is in the closed position.

6. The lockout device of claim 1, wherein the first and second holding surfaces comprise first and second cinch pads having interlocking patterns.

7. The lockout device of claim 1, further comprising first and second slots adjacent to the first and second holding surfaces and adapted to receive the flexible member and position the cinching portion between the first and second holding surfaces.

8. The lockout device of claim 1, further comprising a mounting member removably attached to a lower surface of the bottom member, the mounting member comprising an aperture for receiving the actuating member and a mounting surface for mounting the mounting member to the body.

9. The lockout device of claim 8, wherein the mounting surface comprises a cushion pad.

10. The lockout device of claim 8, further comprising a lockout enclosure for covering the instrument, wherein a portion of the lockout enclosure is captured between the bottom member and the mounting member.

11. The lockout device of claim 10, wherein the lockout enclosure includes a compartment.

12. The lockout device of claim 11, further comprising a lanyard including a fixed end secured to one of the mounting member, the bottom member, and the cover member, and a detachable end receivable between the cover member and the bottom member, wherein the lanyard is adapted to engage a closing portion of the compartment to prevent opening of the compartment.

13. The lockout device of claim 12, wherein the closing portion of the compartment comprises a zipper having a zipper tab for receiving the lanyard therethrough.

14. The lockout device of claim 1, wherein when the flexible member is tightened around a portion of the body and received between the first and second holding surfaces and the cover member is in the closed position, the flexible member prohibits removal of the lockout device from the instrument.

15. A method for locking out a valve having a valve body, a valve stem extending from the valve body for operating the valve, and a valve handle assembled with the valve stem for moving the valve stem to operate the valve, the method comprising:
   removing the valve handle from the valve stem;
   assembling a bottom member with the valve body;
   connecting a first end of a flexible member with the bottom member;
   wrapping a second end of the flexible member around a portion of the valve body;
   tightening the flexible member around the portion of the valve body such that a selected cinching portion of the flexible member is held against the bottom member;
   assembling a cover member with the bottom member such that the cover member covers the valve stem and the cover member holds the selected cinching portion of the flexible member fixed against the bottom member;
   providing a compartment attached to the bottom member, and depositing the removed valve handle in the compartment; and
   attaching a first end of a lanyard to the bottom member, inserting a second end of the lanyard through a closing portion of the compartment, and securing the second end of the lanyard between the bottom member and the cover member.

16. The method of claim 15, further comprising locking the cover member to the bottom member.

17. The method of claim 16, further comprising providing a lock bar connected to The bottom member and inserting the lock bar through an opening in the cover member, wherein locking the cover member to the bottom member comprises inserting a shackle through an opening in the lock bar.

18. The method of claim 15, further comprising positioning the selected cinching portion of the flexible member between opposed holding portions on the bottom member and the cover member.

19. The method of claim 18, further comprising providing interlocking patterns on the opposed holding portions.

20. The method of claim 15, further comprising pivotally attaching the cover member to the bottom member.

21. The method of claim 15, wherein assembling a cover member with the bottom member comprises engaging at least one detent on one of the cover member and the bottom member with at least one detent socket on the other of the cover member and the bottom member.

22. The method of claim 15, further comprising mounting a mounting member to the valve body, wherein assembling a bottom member with the valve body comprises attaching the bottom member to the mounting member.

23. A valve lockout device for a valve having a valve body, a valve stem extending from the valve body for operating the valve, and a valve handle attachable to the valve stem for actuation of the valve stem, the lockout device comprising:
   a latch base bottom, adapted to be positioned over the valve body, the latch base bottom including a lock bar having at least one hole, a first cinch pad and an opening for receiving the valve stem;
   a slide bar connected to the latch base bottom and movable between a locking position and an unlocking position, the slide bar comprising at least one hole and at least one protrusion, wherein the at least one slide bar hole aligns with the at least one lock bar hole when the slide bar is in the locking position;
   a latch base cover connected to the latch base bottom at a hinge portion for movement between a closed position and an open position, the latch base cover including a covering portion for covering the valve stem in the closed position, an opening for receiving the lock bar and the slide bar therethrough in the closed position, at least one notch adapted to align with the at least one slide bar protrusion when the slide bar is in the unlocking position, and a second cinch pad adapted to interlock with the first cinch pad in the closed position;
   a back plate removably attached to a lower surface of the latch base bottom, the back plate comprising an aperture for receiving the valve stem and a cushion pad for conforming the back plate with the valve body;

a bag portion for covering the valve, the bag portion comprising a compartment having a zipper for closing the compartment, wherein at least part of the bag portion is captured between the latch base bottom and the back plate;

a cinch strap having a first end attached to the bag portion, wherein the latch base bottom and the latch base cover are adapted to receive the cinch strap through first and second strap slots to retain a cinching portion of the cinch strap between the first and second cinch pads; and a lanyard including a lanyard anchor retained in an anchor pocket of the latch base member and a free end receivable in a receiver pocket of the latch base member, the free end being retained in the receiver pocket when the latch base cover is in the closed position, wherein the lanyard is adapted to fit through a zipper pull on the zipper to secure the zipper in a closed position.

* * * * *

UNITED STATES PATENT AND TRADEMARK OFFICE
CERTIFICATE OF CORRECTION

PATENT NO. : 7,581,420 B2
APPLICATION NO. : 11/452051
DATED : September 1, 2009
INVENTOR(S) : Manthe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 480 days.

Signed and Sealed this

Fourteenth Day of September, 2010

David J. Kappos
*Director of the United States Patent and Trademark Office*